(12) United States Patent
Kim

(10) Patent No.: US 11,322,149 B2
(45) Date of Patent: May 3, 2022

(54) ARTIFICIAL INTELLIGENCE APPARATUS FOR GENERATING RECIPE INFORMATION AND METHOD THEREOF

(71) Applicant: LG ELECTRONICS INC., Seoul (KR)

(72) Inventor: Hyeongjin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 81 days.

(21) Appl. No.: 16/750,730

(22) Filed: Jan. 23, 2020

(65) Prior Publication Data

US 2021/0118447 A1 Apr. 22, 2021

(30) Foreign Application Priority Data

Oct. 18, 2019 (KR) .................. 10-2019-0129608

(51) Int. Cl.
*G09B 5/06* (2006.01)
*G10L 15/22* (2006.01)
*G10L 15/26* (2006.01)
*G06N 20/00* (2019.01)
*G10L 15/24* (2013.01)
*G06K 9/00* (2022.01)

(52) U.S. Cl.
CPC .......... *G10L 15/26* (2013.01); *G06K 9/00718* (2013.01); *G06N 20/00* (2019.01); *G09B 5/06* (2013.01); *G10L 15/22* (2013.01); *G10L 15/24* (2013.01)

(58) Field of Classification Search
CPC ..................... G06N 20/00; G06K 9/00718
See application file for complete search history.

(56) References Cited

U.S. PATENT DOCUMENTS

| 9,311,568 | B1* | 4/2016 | Feller | G06K 9/00469 |
| 2007/0114224 | A1* | 5/2007 | Nagamitsu | G06K 9/00355 |
| | | | | 219/490 |
| 2014/0272817 | A1* | 9/2014 | Park | G09B 5/02 |
| | | | | 434/127 |
| 2015/0073940 | A1* | 3/2015 | Jo | G06Q 30/0625 |
| | | | | 705/26.62 |
| 2015/0119003 | A1* | 4/2015 | Park | H04W 4/00 |
| | | | | 455/414.1 |
| 2015/0339394 | A1* | 11/2015 | Jinq | G06F 40/143 |
| | | | | 715/776 |
| 2018/0308143 | A1* | 10/2018 | Chan | G06Q 30/0643 |
| 2020/0068265 | A1* | 2/2020 | Pinel | G10L 15/26 |

* cited by examiner

*Primary Examiner* — Jialong He
(74) *Attorney, Agent, or Firm* — Birch, Stewart, Kolasch & Birch, LLP

(57) ABSTRACT

Disclosed herein are an artificial intelligence apparatus for generating recipe information including a learning processor configured to generate recipe text including at least one of cooking ingredient information or description text of cooking from cooking content, by providing the cooking content to a recipe text generation model, and a processor configured to generate recipe information of the cooking based on the recipe text, and a method of operating the same.

16 Claims, 9 Drawing Sheets

FIG. 6
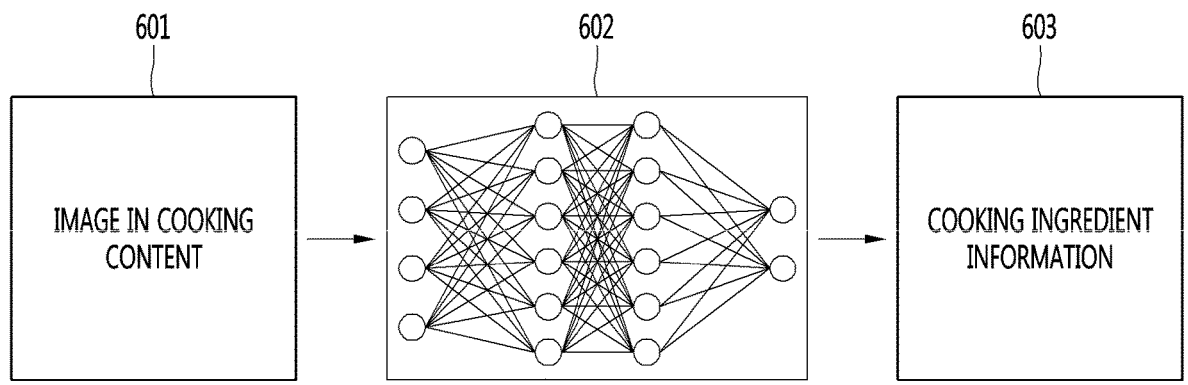
(a)
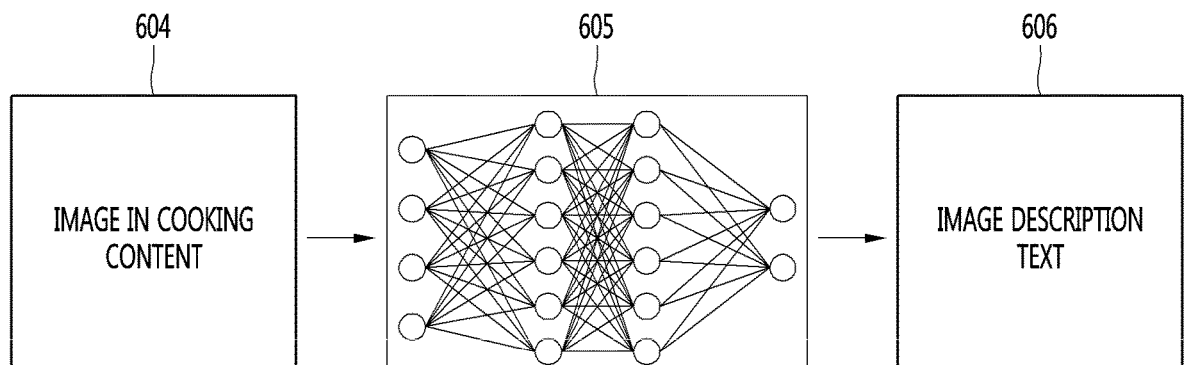
(b)
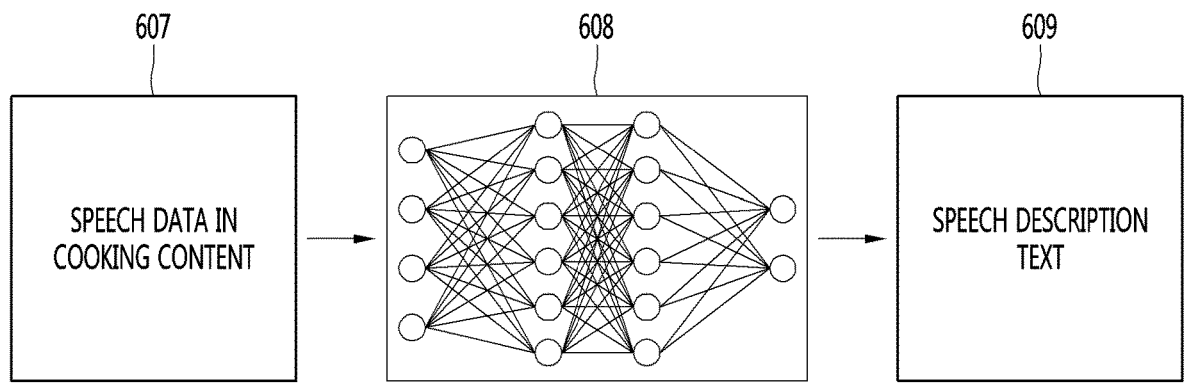
(c)

ARTIFICIAL INTELLIGENCE APPARATUS FOR GENERATING RECIPE INFORMATION AND METHOD THEREOF

CROSS-REFERENCE TO RELATED APPLICATIONS

This application claims priority benefit to Korean Patent Application No. 10-2019-0129608 filed in the Republic of Korea on Oct. 18, 2019, the entirety of which is hereby incorporated by reference.

BACKGROUND

The present disclosure relates to an artificial intelligence apparatus and method for generating recipe information and, more particularly, to an artificial intelligence apparatus and method for generating recipe information from cooking content.

Artificial intelligence is a field of computer engineering and information technology for researching a method of enabling a computer to do thinking, learning and self-development that can be done by human intelligence, and means that a computer can imitate a human intelligent action.

In addition, artificial intelligence does not exist in itself but has many direct and indirect associations with the other fields of computer science. In particular, today, attempts to introduce artificial intelligent elements to various fields of information technology to deal with issues of the fields have been actively made.

Meanwhile, technology for recognizing and learning a surrounding situation using artificial intelligence and providing information desired by a user in a desired form or performing a function or operation desired by the user is actively being studied.

An electronic device for providing such operations and functions may be referred to as an artificial intelligence device.

Meanwhile, demands for learning cooking via a cooking video are increasing.

However, when a user watches a cooking lecture video, the user needs to write the content of the video and take tedious notes for preparing and following a recipe.

Accordingly, there is an increasing need to automatically generate a recipe using an image or speech of a cooking video.

SUMMARY

An object of the present disclosure is to solve the above-described problems and the other problems.

Another object of the present disclosure is to provide an artificial intelligence apparatus and method for recognizing an image, speech and text included in cooking content and automatically generating a recipe based on a recognized result.

Another object of the present disclosure is to provide an artificial intelligence apparatus and method for inferring numerical information capable of quantifying unclear words which are difficult to be quantified when cooking is explained in a cooking video and generating recipe information using the inferred numerical information.

According to an embodiment, provided is an artificial intelligence apparatus including a learning processor configured to generate recipe text including at least one of cooking ingredient information or description text of cooking from cooking content, by providing the cooking content to a recipe text generation model, and a processor configured to generate recipe information of the cooking based on the recipe text.

According to another embodiment, provided is an artificial intelligence apparatus including a learning processor configured to generate description text recognized from an image included in cooking content or speech data included in the cooking content, by providing the cooking content to a description text generation model, and a processor configured to generate recipe information of the cooking based on recipe text including the description text.

According to another embodiment, provided is an artificial intelligence apparatus including a processor configured to determine whether an unclear word is included in the description text and acquire a content section, in which the unclear word appears, from the cooking content, and a learning processor configured to acquire numerical information including information on at least one of the amount of cooking ingredient, a cooking time or a cooking temperature, the numerical information quantifying the unclear word based on an image included in sectional content corresponding to the content section.

According to another embodiment, provided is a method of generating recipe information including generating recipe text including at least one of cooking ingredient information or description text of cooking from cooking content, by providing the cooking content to a recipe text generation model, and generating recipe information of the cooking based on the recipe text.

According to another embodiment, provided is a method of generating recipe information, including generating description text recognized from an image included in cooking content or speech data included in the cooking content, by providing the cooking content to a description text generation model, and generating recipe information of the cooking based on recipe text including the description text.

According to another embodiment, provided is a method of generating recipe information, including determining whether an unclear word is included in the description text, acquiring a content section, in which the unclear word appears, from the cooking content, acquiring numerical information including information on at least one of the amount of cooking ingredient, a cooking time or a cooking temperature, the numerical information quantifying the unclear word based on an image included in sectional content corresponding to the content section, and adding the numerical information to the description text.

BRIEF DESCRIPTION OF THE DRAWINGS

FIG. 6 is a view illustrating a cooking ingredient recognition mode, a text recognition model and a speech recognition model according to an embodiment of the present disclosure.

DETAILED DESCRIPTION OF THE EMBODIMENTS

Figure 1:
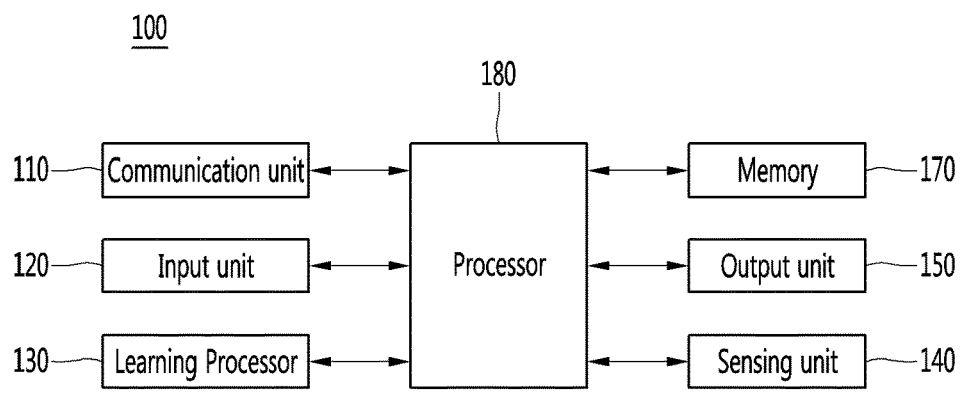
FIG. 1 illustrates an AI device 100 according to an embodiment of the present disclosure.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the disclosure in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the disclosure in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI device 100 according to an embodiment of the present disclosure.

The AI device (or an AI apparatus) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this situation, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 to drive an application program stored in memory 170. Furthermore, the processor 180 may operate two or more of the components included in the AI device 100 in combination to drive the application program.

Figure 2:
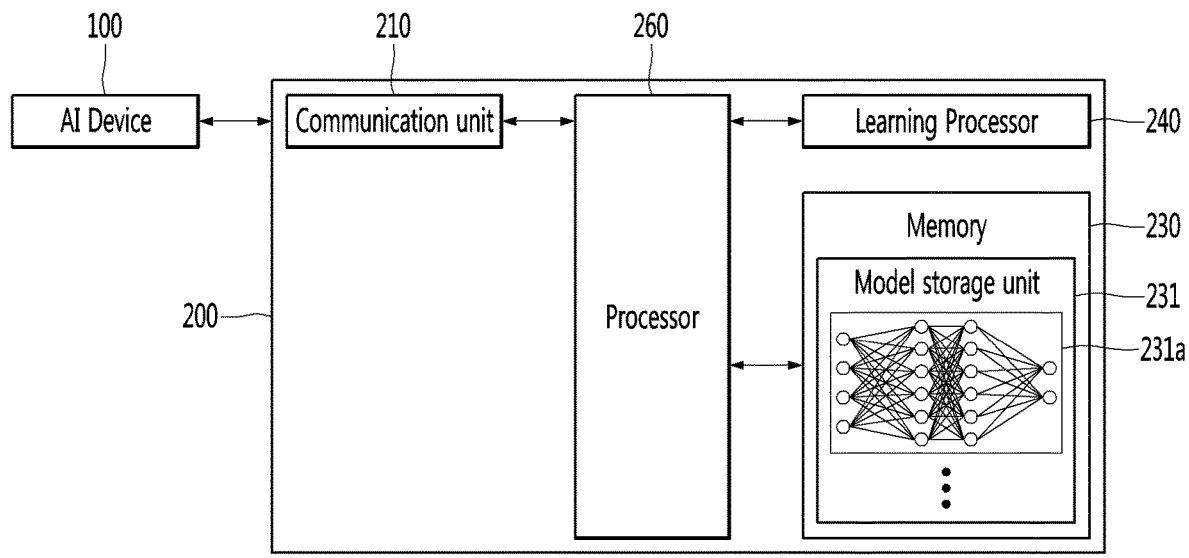
FIG. 2 illustrates an AI server 200 according to an embodiment of the present disclosure.

FIG. 2 illustrates an AI server 200 according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
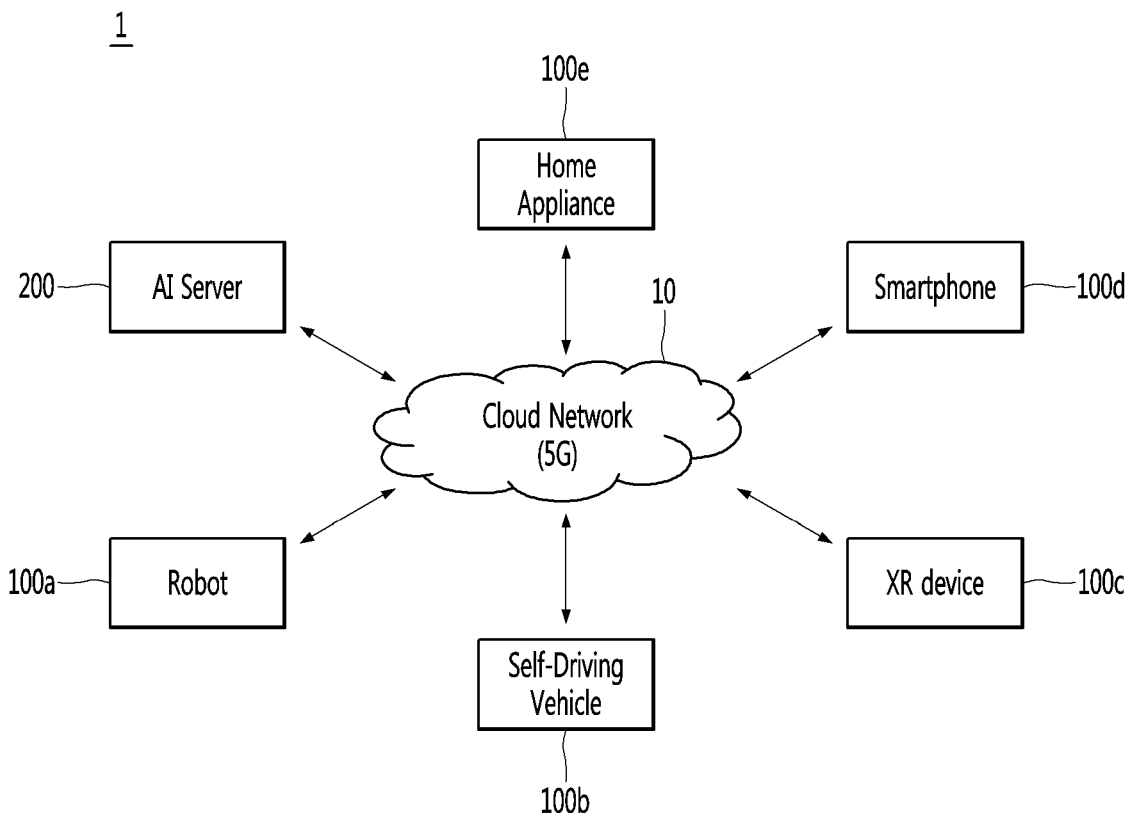
FIG. 3 illustrates an AI system 1 according to an embodiment of the present disclosure.

FIG. 3 illustrates an AI system 1 according to an embodiment of the present disclosure.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling movement line by using the recognized surrounding information or object information. The learning model may be learned directly from the self-driving vehicle 100a or may be learned from an external device such as the AI server 200.

At this time, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external apparatus to determine the travel route and the travel plan, and may control the driving unit such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving unit based on the control/interaction of the user. At this time, the self-driving vehicle 100b may acquire the intention information of the interaction due to the user's operation or speech utterance, and may determine the response based on the acquired intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

At this time, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this situation, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

At this time, when the XR object is output to the HUD, at least part of the XR object may be outputted to overlap the actual object to which the passenger's gaze is directed. Meanwhile, when the XR object is output to the display provided in the self-driving vehicle 100b, at least part of the XR object may be output to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100*b* or the XR device 100*c* may generate the XR image based on the sensor information, and the XR device 100*c* may output the generated XR image. The self-driving vehicle 100*b* may operate based on the control signal input through the external device such as the XR device 100*c* or the user's interaction.

Figure 4:
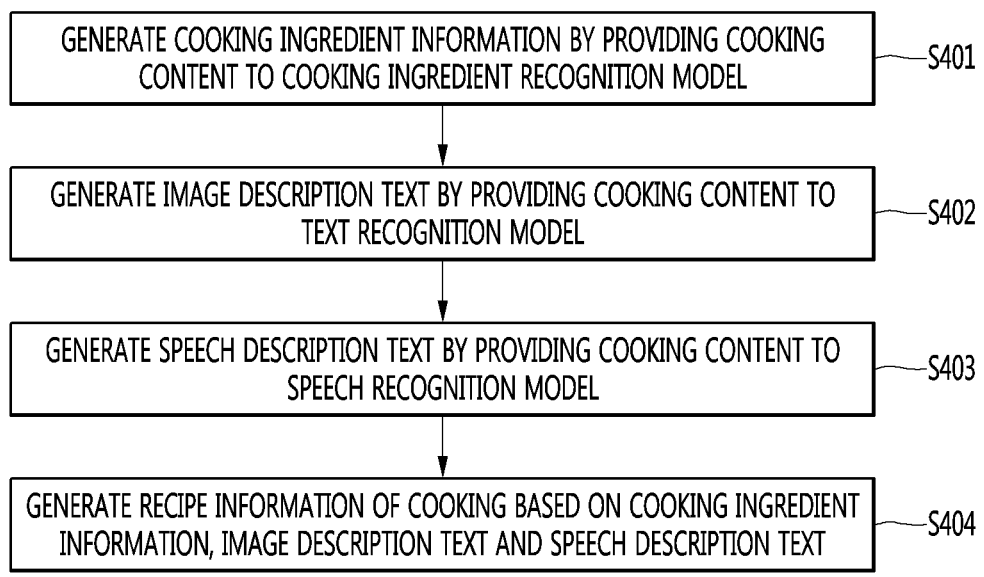
FIG. 4 is a flowchart illustrating a method of generating a recipe from a cooking video according to an embodiment of the present disclosure.

FIG. 4 is a flowchart illustrating a method of generating a recipe from a cooking video according to an embodiment of the present disclosure.

Cooking content may include a video and audio for explaining a cooking process, and may include a video and audio for explaining the name of food to be cooked, ingredients required for cooking, a cooking process, cooking utensils, cooking times, cooking temperatures, etc. In addition, the cooking content may be a cooking video for explaining a cooking method.

The learning processor 130 may provide cooking content to a recipe text generation model and generate recipe text including at least one of cooking ingredient information or description text of cooking from the cooking content.

A recipe generation model may be an artificial neural network model for generating cooking ingredient information and description text from image or speech data included in the cooking content. The recipe generation model may include at least one of a cooking ingredient recognition model, a text recognition model or a speech recognition model.

In addition, the processor 180 may generate recipe information of cooking based on recipe text.

The learning processor 130 may generate cooking ingredient information by providing the cooking content to the cooking ingredient recognition model (S401).

In addition, the cooking content may refer to content received via the communication unit 110 or content stored in the memory 170.

For example, the user of the artificial intelligence apparatus 100 may store the cooking content in the memory 170. When the user of the artificial intelligence apparatus 100 watches the cooking content stored in the memory 170, the artificial intelligence apparatus 100 may generate recipe information of the cooking content. In addition, the communication unit 110 may receive the cooking content, the recipe of which is requested to be generated, from the smartphone 100*d* for performing wired/wireless communication with the artificial intelligence apparatus 100.

The cooking ingredient recognition model may refer to an artificial neural network (ANN) model used in machine learning. In addition, the cooking recognition model may be an artificial neural network (ANN) model which uses convolution operation.

The cooking ingredient recognition model is composed of artificial neurons (nodes) that form a network by synaptic connections. The cooking ingredient recognition model can be defined by a connection pattern between neurons in different layers, a learning process for updating model parameters, and an activation function for generating an output value.

The cooking recognition model may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

The cooking ingredient recognition model may be classified into supervised learning, unsupervised learning, and reinforcement learning according to a learning method.

For example, when the cooking ingredient recognition model is generated through the supervised learning, learning may be performed in a state in which a label for learning data is given. The label may mean a correct answer (or result value) that the artificial neural network must infer when the learning data is input to the artificial neural network.

The learning processor 130 may designate a label for specifying a food or ingredient image. For example, it is possible to label and designate various food names and ingredient names such as rice cake, onion, carrot, paprika, oyster mushroom, etc. with respect to each food or ingredient image.

Accordingly, the learning processor 130 may perform labeling with respect to the food or ingredient image and train the cooking ingredient recognition model to recognize the cooking ingredients. Accordingly, when an image in new content is input, the label of the food or ingredient image included in the image in the content may be determined to determine cooking ingredients.

In addition, the cooking ingredient recognition model may be trained even via unsupervised learning for training an artificial neural network in a state in which a label for learning data is not given or reinforcement learning for performing training to select an action or the order of actions for allowing an agent defined in a certain environment to maximize a cumulative reward in each state.

Referring to FIG. 6(*a*), the learning processor 130 may provide an image 601 in the cooking content to the cooking ingredient recognition model 602 as input data and generate cooking ingredient information 603 included in the cooking content as output data.

Figure 7:
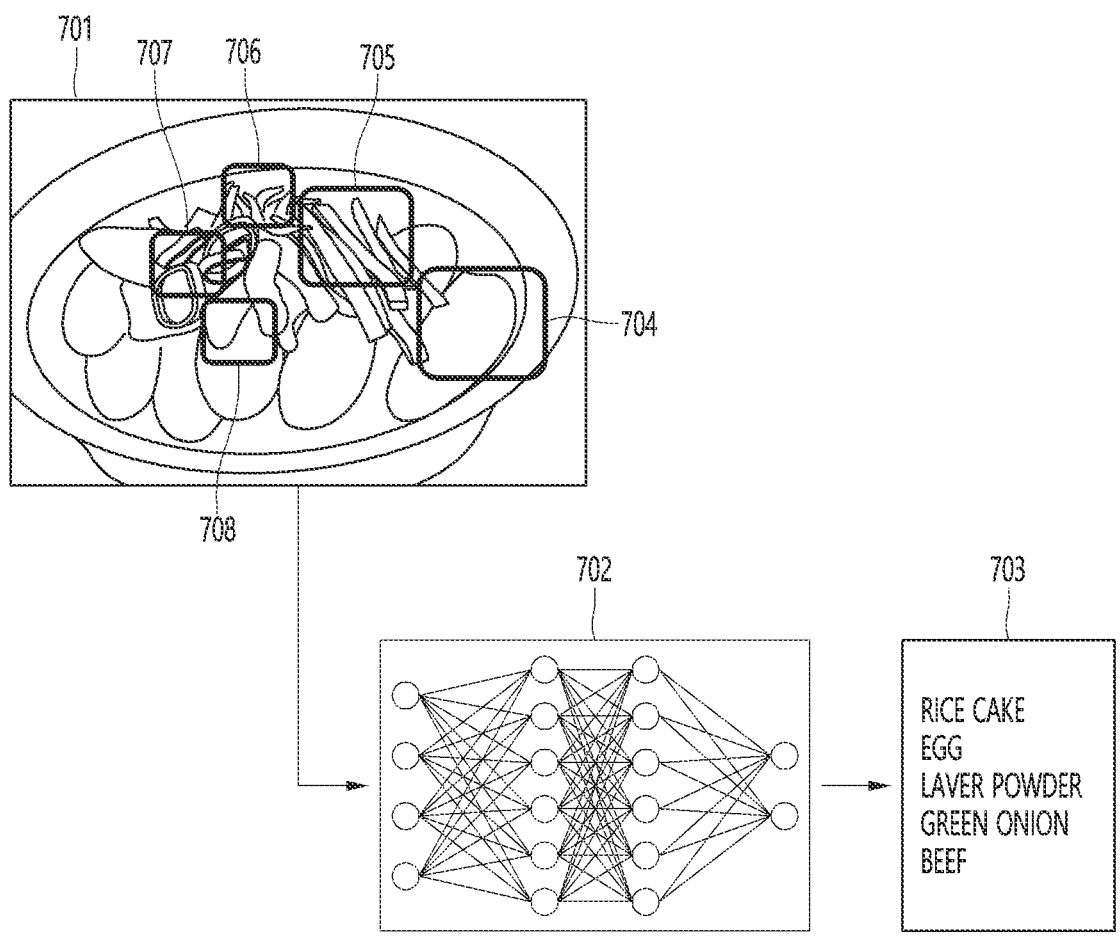
FIG. 7 is a view illustrating a process of generating information on ingredients required for cooking from an image in a cooking video according to an embodiment of the present disclosure.

For example, referring to FIG. 7, the learning processor 130 may provide an image 701 included in the cooking content to the cooking ingredient recognition model 702 as input data and generate cooking ingredient information 703 included in the cooking content as output data.

If the cooking content is a cooking video explaining a food recipe, the image 701 in the cooking content may be a frame-by-frame image in the cooking image.

In addition, the cooking ingredient information 703 may include information on rice cake 704, egg 705, layer powder 706, green onion 707 and beef 708 recognized from the image 701 included in the cooking content.

The learning processor 130 may provide the cooking content to the description text generation model to generate description text recognized from the speech data included in the cooking content or the image included in the cooking content.

In addition, the learning processor 130 may also generate section information of content, from which description text is extracted, when the description text is generated.

The description text generation model may include a text recognition model for recognizing text represented as a graphic image from a predetermined image and outputting the recognized text. In addition, the description text generation model may include a speech recognition model for recognizing speech from the speech data included in the cooking content, converting the converted speech into text, and outputting the converted text.

The text recognition model and the speech recognition model may be an artificial neural network (ANN) model used in machine learning. In addition, these may be generated via supervised learning, unsupervised learning or reinforcement learning. Meanwhile, the speech recognition model may be a recurrent neural network (RNN) model.

The description text may include image description text and speech description text.

The image description text may mean text represented by a graphic image in the cooking content, and the speech description text may mean text converted from the speech data included in the cooking content through speech recognition.

The learning processor 130 may generate the image description text from the image included in the cooking content by providing the image included in the cooking content to the text recognition model (S402).

Referring to FIG. 6(*b*), the learning processor 130 may provide the cooking content image 604 to the text recognition model 605 as input data to generate the image description text 606 as output data.

Figure 8:
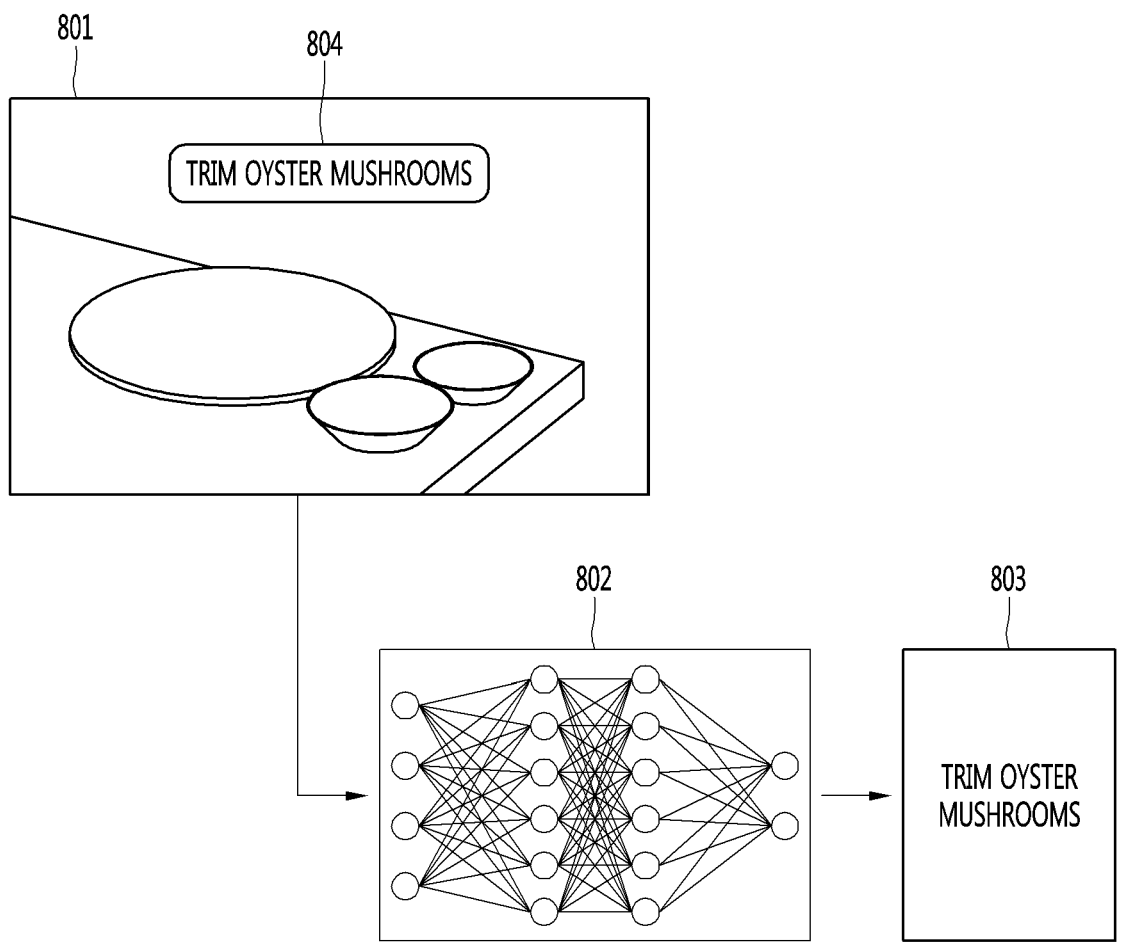
FIG. 8 is a view illustrating a process of generating image description text related to cooking from an image in a cooking video according to an embodiment of the present disclosure.

For example, referring to FIG. 8, the learning processor 130 may provide a text recognition model 802 with an image 801 included in the cooking content as input data to generate image description text 803 recognized from the image included in the cooking content as output data.

The image 801 included in the cooking content may be a frame-by-frame image in the cooking video. The image 801 included in the cooking video may include text 804 represented by a graphic image as content for describing a cooking method.

In addition, the image description text 803 may be a result of recognizing the text 804 represented by the graphic image in the image 801 included in the cooking content and may become output text. For example, if the text 804 represented by the graphic image in the image 801 included in the cooking content is "Trim oyster mushrooms," the text recognition model may output the image description text 803 "Trim oyster mushrooms."

In addition, the learning processor 130 may generate speech description text from the speech data included in the cooking content by providing the speech data included in the cooking content to the speech recognition model (S403).

Referring to FIG. 6(*c*), the learning processor 130 may provide the speech recognition model 608 with the speech data 607 in the cooking content as input data and generate speech description text 609 as output data.

Figure 9:
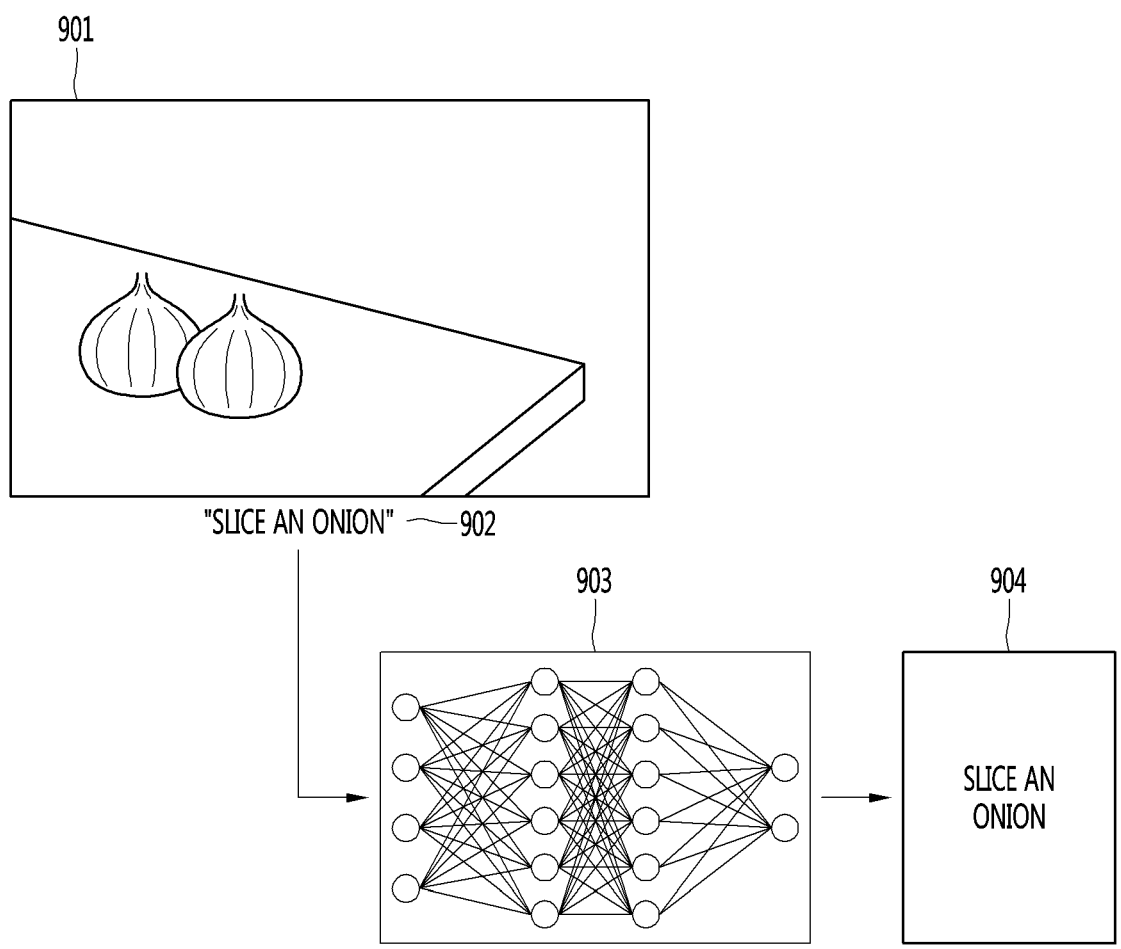
FIG. 9 is a view illustrating a process of generating speech description text related to cooking from speech data included in a cooking video according to an embodiment of the present disclosure.

For example, referring to FIG. 9, the learning processor 130 may provide the speech recognition model 903 with speech data 902 included in the cooking content 901 as input data and generate speech description text 904 recognized from the speech data included in the cooking content as output data.

The speech data 902 included in the cooking content may be audio data in the cooking content and may be speech recorded in order to explain the cooking process.

In addition, the speech description text 904 may become output text which is a result of recognizing speech from the speech data 902 included in the cooking content. For example, when the speech data 902 included in the cooking content is "Slice an onion," the speech recognition model may output speech description text 903 "Slice an onion."

The processor 180 may generate recipe information of cooking based on cooking ingredient information and description text (S404).

The recipe information may include the name of food to be cooked, ingredients required for cooking and a description of steps of a cooking process.

The processor 180 may generate recipe information based on the order in which the description text is described in the cooking content.

For example, the processor 180 may generate recipe information such that recipe step information "Trim oyster mushrooms" precedes recipe step information "Slice an onion," when section information of the content, from which the image description text "Trim oyster mushrooms" is extracted, is 1 minute and 23 seconds and section information of content, from which the speech description text "Slice an onion" is extracted, is 2 minutes and 20 seconds. Accordingly, the processor 180 may generate recipe information in which descriptions of steps are sequentially arranged.

In addition, when words about the cooking ingredients in the description text are included in cooking ingredient information, the processor 180 may determine the description text as recipe information of cooking. The cooking ingredient information may be information on cooking ingredients recognized from the image included in the cooking content. The processor 180 may generate recipe information using the description text determined as the recipe information.

For example, when the generated image description text or the speech description text is "Boil an egg," the processor 180 may determine whether a word "egg" about the cooking ingredient in the description text is included in cooking ingredient information. When the word "egg" about the cooking ingredient in the description text is included in cooking ingredient information, the processor 180 may determine the description text "Boil an egg" as recipe information of cooking.

Meanwhile, for example, when the image description text or the speech description text is "I am going to introduce cooking using onions in the next video," the processor 180 may determine whether a word "onion" about the cooking ingredient in the description text is included in cooking ingredient information. Upon determining that the word "onion" about the cooking ingredient in the description text is not included in cooking ingredient information, the processor 180 may determine description text "It's a good weather" as non-recipe information.

Meanwhile, for example, when the image description text or the speech description text is "It's a good weather," the description recipe may be non-recipe information, not recipe information of cooking. The processor 130 may determine that the word about the cooking ingredient in the description text is not included and classify the description text "It's a good weather" as non-recipe information.

Figure 5:
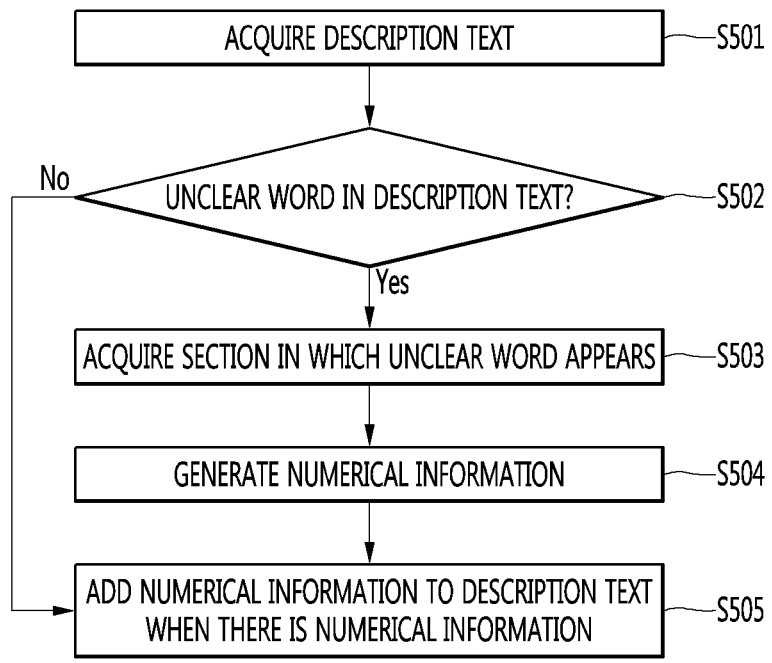
FIG. 5 is a flowchart illustrating a method of quantifying an unclear word included in unclear description text and generating recipe information according to an embodiment of the present disclosure.

FIG. 5 is a flowchart illustrating a method of quantifying an unclear word included in unclear description text and generating recipe information according to an embodiment of the present disclosure.

The processor 180 may acquire the description text generated by the learning processor 130 (S501).

The processor 180 may determine whether an unclear word is included in the description text (S502).

The unclear word may mean a word which cannot be measured numerically. In addition, the unclear word may include an expression combined with an unclear word. For example, a creator of cooking lecture content may explain cooking using unclear expressions which cannot be measured numerically in a cooking explanation process. For example, unclear words about the amount of cooking ingredient may include "appropriately," "enough" and "one spoon." Unclear words about a cooking time may include "until this is reddened," "until soup is boiled away" and "until this is boiled over." Unclear words about a cooking temperature may include "medium heat" and "not too hot."

The memory 170 may store an unclear word database in which unclear words are classified and stored.

The unclear word database may store at least one of unclear words related to the amount of cooking ingredient, the texture of the cooking ingredient, the color of the cooking ingredient, a cooking time, a cooking temperature, and a cooking progress state.

For example, the unclear word database may store unclear words about the amount of cooking ingredient such as "half cup," "one spoon" and "this much." In addition, unclear words about the texture of the cooking ingredient, such as "crispy" and "chewy," may be stored. In addition, the unclear word database may store unclear words about the color of the cooking ingredient, such as "yellow" and "black." In addition, the unclear word database may store unclear words about a cooking time, such as "until this is boiled" or "until soup is boiled away." In addition, the unclear word database may store unclear words about a cooking temperature, such as "hot," "cold." In addition, the unclear word database may store unclear words about a cooking progress state, such as "to the end" and "long."

The unclear word data base is not limited by the above embodiment and may store numerically unclear recipe related words. Meanwhile, unclear words about the cooking progress state may include unclear words about the cooking time and the cooking temperature. The processor 180 may retrieve a word included in the description text from the unclear word database and determine the word included in the description text as an unclear word when the word included in the description text is retrieved from the unclear word database.

The processor 180 may acquire information on a content section in which an unclear word appears (S503). For example, when description text "Put soy sauce appropriately" is generated, the learning processor 130 may generate section information of the cooking content, from which the description text is extracted, [start: 1 minute and 30 seconds, end: 1 minute and 45 seconds]. The processor 180 may acquire a content section in which an unclear word appears in the cooking content based on the content section information generated along with the description text.

The learning processor 130 may generate numerical information including information at least one of the amount of cooking ingredient, a cooking time or a cooking temperature, which quantifies an unclear word based on the image included in the sectional content corresponding to the content section (S504).

The learning processor 130 may use different neural network models, in order to generate numerical information of the unclear word depending on whether the unclear word is about the amount of ingredient or a word about a cooking progress state.

The processor 180 may determine whether the unclear word is about the amount of cooking ingredient. When the unclear word is about the amount of cooking ingredient, the learning processor 130 may provide an image included in sectional content to an ingredient quantity recognition model to generate quantity information on the amount of cooking ingredient according to a cooking utensil and cooking ingredient image appearing in the image included in the sectional content, and generate the numerical information based on the quantity information related to the amount of cooking ingredient.

Figure 10:
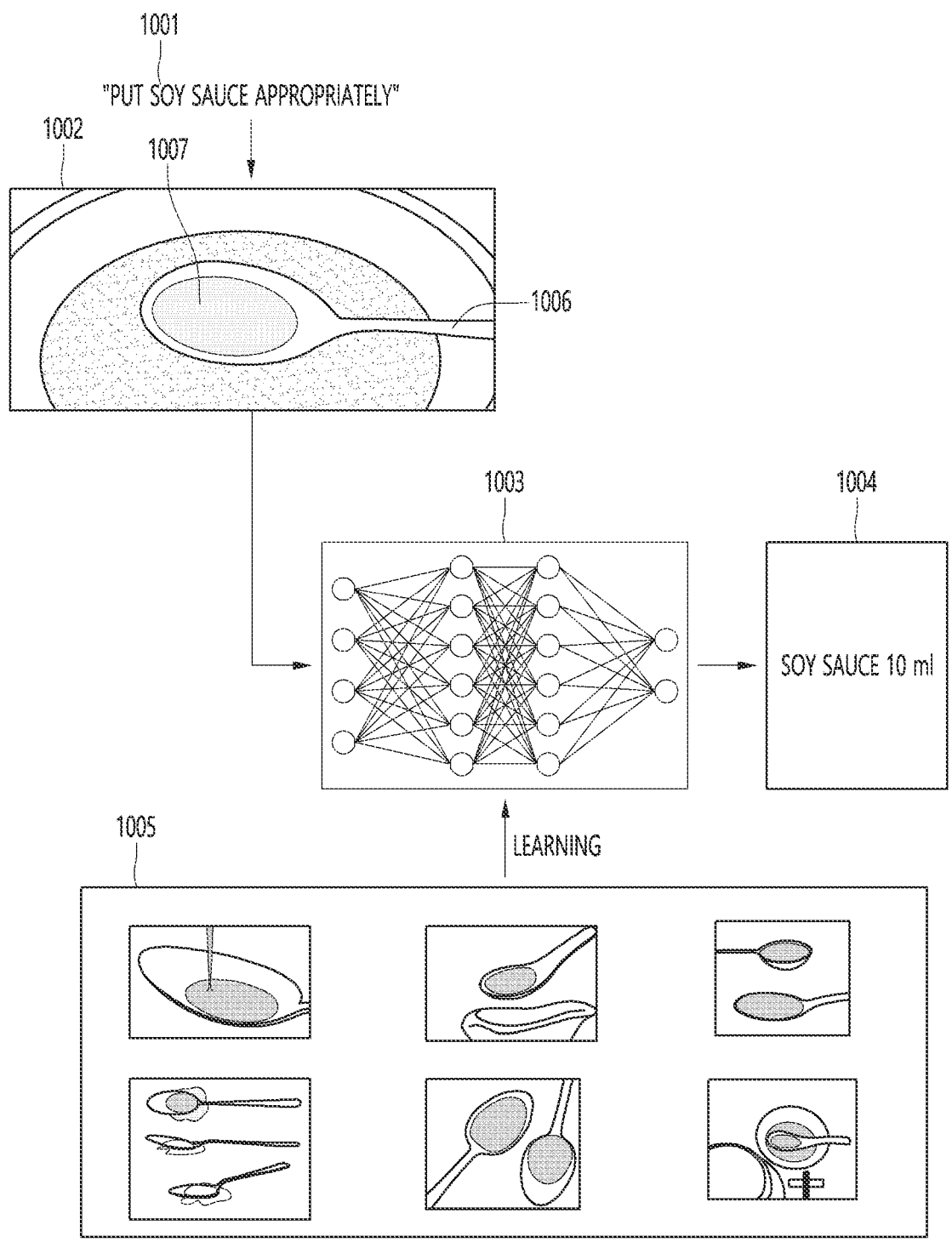
FIG. 10 is a view illustrating a method of generating recipe information in which unclear words are quantified when the amount of cooking ingredient is explained using an unclear word in a cooking video according to an embodiment of the present disclosure.
Figure 11:
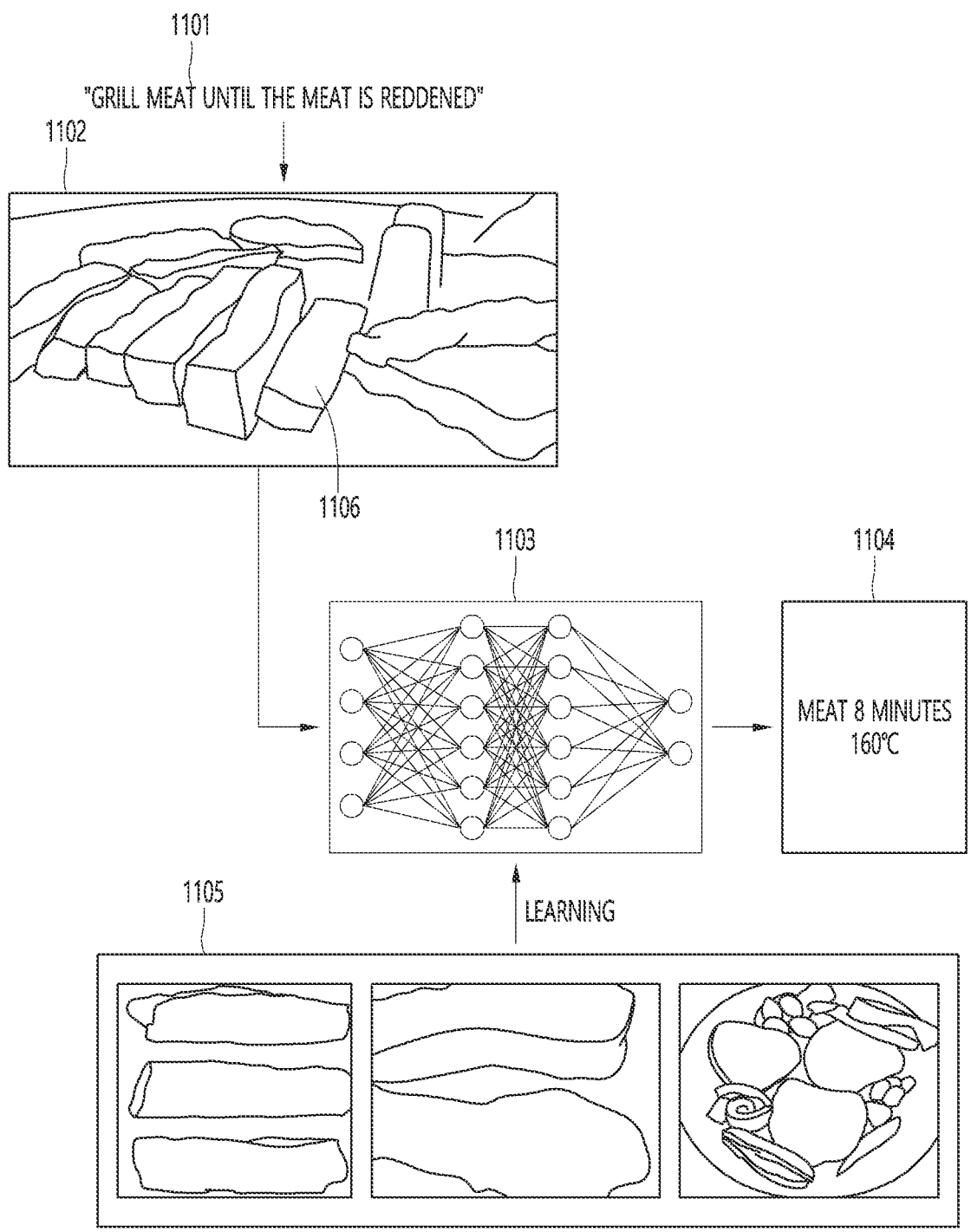
FIG. 11 is a view illustrating a method of generating recipe information in which an unclear word is quantified when a cooking time and a cooking temperature are explained using unclear words in a cooking video according to an embodiment of the present disclosure.

For example, referring to FIG. 10, when the description text 1001 is "Put the soy sauce appropriately," the processor 180 may determine whether the word "appropriately" determined as the unclear word is about the amount of cooking ingredient. For example, the processor 180 may determine that the unclear word "appropriately" combined with the cooking ingredient "soy sauce" and cooking operation "put" is about the amount of cooking ingredient, with respect to the description text 1001 "Put the soy sauce appropriately."

The learning processor 130 may provide an image 1002 included in the sectional content to an ingredient quantity recognition model 1003 to generate numerical information "soy sauce 10 ml" 1004 including quantity information relating to the amount of cooking ingredient according to a cooking utensil 1006 and a cooking ingredient 1007 appearing on the image 1002 included in the sectional content.

In this situation, the ingredient quantity recognition model 1003 may be an artificial neural network model trained with learning data 1005 in which an image obtained by capturing a spoon and an ingredient placed on the spoon is used as input data and a correct answer for the amount of ingredient is labeled in each image.

The processor 180 may determine whether the unclear word is about a cooking time or a cooking temperature. When the unclear word is about a cooking time or a cooking temperature, the learning processor 130 may provide an image included in sectional content to a cooking progress state recognition model and generate numerical information including the cooking time or the cooking temperature according to a cooking ingredient image appearing on the image included in the sectional content.

For example, when the description text is "Grill meat until the meat is reddened," the processor 180 may determine that an unclear word "reddened" combined with a cooking ingredient "meat" and cooking operation "grill" is about a cooking progress state (cooking time or cooking temperature). The word about the cooking progress state may mean a word related to the cooking time or the cooking temperature.

The learning processor 130 may provide an image 1102 included in sectional content to the cooking progress state recognition model 1003 and generate numerical information "meat 8 minutes 160° C." 1104 including the cooking time or the cooking temperature according to the cooking ingredient 1106 appearing on the image 1102 included in the sectional content.

In this situation, the cooking progress state recognition model 1103 may be an artificial neural network model trained with learning data 1105 in which a meat image is used as input data and a correct answer for a meat grilling time or a meat grilling temperature is labeled in each image.

The processor 180 may add the numerical information to the description text (S505).

For example, when the description text is "Put soy sauce appropriately," the processor 180 may add numerical information like "Put soy sauce appropriately (10 ml)."

According to embodiments of the present invention, it is possible to acquire a cooking recipe explained in a cooking lecture video or content even if a user who watches the cooking lecture video or content does not write the recipe.

In addition, according to embodiments of the present invention, it is possible to generate an accurate recipe by quantifying an unclear description of a cooking video. Therefore, the user can efficiently learn cooking.

The present disclosure may be embodied as computer-readable codes on a program-recorded medium. The computer-readable recording medium may be any recording medium that can store data which can be thereafter read by a computer system. Examples of the computer-readable medium may include a hard disk drive (HDD), a solid state disk (SSD), a silicon disk drive (SDD), a ROM, a RAM, a CD-ROM, a magnetic tape, a floppy disk, and an optical data storage device. The computer may also include the processor 180 of the server.

The present disclosure is thus not limited to the example embodiments described above, and rather intended to include the following appended claims, and all modifications, equivalents, and alternatives falling within the spirit and scope of the following claims.

What is claimed is:

1. A method of generating recipe information, the method comprising:
   receiving cooking content based on audio data or video data;
   inputting the cooking content to a recipe text generation model;
   generating recipe text for preparing food from the cooking content based on an output of the recipe text generation model, the recipe text including at least one of cooking ingredient information for preparing the food or description text for preparing the food; and
   generating recipe information for preparing the food based on the recipe text generated based on the output of the recipe text generation model,
   wherein the generating of the recipe text includes:
      inputting the cooking content to a description text generation model; and
      generating description text recognized from an image included in the cooking content or speech data included in the cooking content, based on an output of the description text generation model,
   wherein the generating of the recipe information is based on the recipe text including the description text generated based on the output of the description text generation model, and
   wherein the generating of the description text includes:
      determining whether an unclear word regarding how the food is to be prepared is included in the description text;
      acquiring a content section including the unclear word from the cooking content;
      acquiring numerical information including information on at least one of an amount of cooking ingredient, a cooking time or a cooking temperature, the numerical information quantifying the unclear word based on an image included in sectional content corresponding to the content section; and
      adding the numerical information corresponding to the unclear word to the description text.

2. The method of claim 1, wherein the generating of the description text includes:
   inputting the image included in the cooking content to a text recognition model;
   generating image description text for describing an object recognized within the image included in the cooking content based on an output of the text recognition model;
   inputting the speech data included in the cooking content to a speech recognition model; and
   generating speech description text recognized from the speech data included in the cooking content based on an output of the speech recognition model.

3. The method of claim 1, wherein the generating of the recipe information is based on an order in which the description text is described in the cooking content.

4. The method of claim 1, further comprising:
   inputting the cooking content to a cooking ingredient recognition model; and
   generating cooking ingredient information from the image included in the cooking content based on an output of the cooking ingredient recognition model,
   wherein the generating of the recipe information includes determining the description text as recipe information for preparing the food when a word about a cooking ingredient in the description text is included in the cooking ingredient information.

5. The method of claim 1, wherein the determining of whether the unclear word is included in the description text includes:
   retrieving a word included in the description text from an unclear word database storing a list of frequently used unclear words or unclear cooking phrases; and
   determining a word included in the description text as an unclear word when the word included in the description text is retrieved from the unclear word database.

6. The method of claim 5, wherein the unclear word database stores at least one of the amount of cooking ingredient, a texture of the cooking ingredient, a color of the cooking ingredient, a cooking time, a cooking temperature or a cooking progress state.

7. The method of claim 1, wherein the acquiring of the numerical information includes:
   determining whether the unclear word is related to the amount of cooking ingredient;
   inputting the image included in the sectional content to an ingredient quantity recognition model; and
   generating numerical quantity information for the amount of the cooking ingredient based on a cooking utensil used in an image included in the sectional content and a cooking ingredient appearing in the image included in the sectional content, based on an output of the ingredient quantity recognition model.

8. The method claim 1, wherein the acquiring of the numerical information includes:
   determining whether the unclear word is related a cooking time or a cooking temperature;
   inputting the image included in the sectional content to a cooking progress state recognition model; and
   generating the numerical information including a cooking time or a cooking temperature according to a cooking ingredient appealing in an image included in the sectional content based on an output of the cooking progress state recognition model.

9. An artificial intelligence apparatus for generating recipe information, the artificial intelligence apparatus comprising:
   a learning processor configured to:
      receive cooking content based on audio data or video data,
      input the cooking content to a recipe text generation model, and
      generate recipe text for preparing food from the cooking content based on an output of the recipe text generation model, the recipe text including at least one of cooking ingredient information for preparing the food or description text for preparing the food; and
   a processor configured to:
      generate recipe information for preparing the food based on the recipe text generated based on the output of the recipe text generation model,
   wherein the learning processor is further configured to:
      input the cooking content to a description text generation model, and
      generate description text recognized from an image included in the cooking content or speech data included in the cooking content, based on an output of the description text generation model,
wherein processor is further configured to;
generate the recipe information based on the recipe text including the description text,
determine whether an unclear word regarding how the food is to be prepared is included in the description text, and
acquire a content section including the unclear word from the cooking content, and
wherein the learning processor is further configured to:
acquire numerical information including information on at least one of an amount of cooking ingredient, a cooking time or a cooking temperature, the numerical information quantifying the unclear word based on an image included in sectional content corresponding to the content section, and
add the numerical information corresponding to the unclear word to the description text.

10. The artificial intelligence apparatus of claim 9, wherein the learning processor is further configured to:
input the image included in the cooking content to a text recognition model,
generate image description text for describing an object recognized within the image included in the cooking content based on an output of the text recognition model,
input the speech data included in the cooking content to a speech recognition model, and
generate speech description text recognized from the speech data included in the cooking content based on an output of the speech recognition model.

11. The artificial intelligence apparatus of claim 9, wherein the processor is further configured to:
generate the recipe information based on an order in which the description text is described in the cooking content.

12. The artificial intelligence apparatus of claim 9, wherein the learning processor is further configured to:
input the cooking content to a cooking ingredient recognition model, and
generate cooking ingredient information from the image included in the cooking content based on an output of the cooking ingredient recognition model, and
wherein the processor is further configured to:
generate of the recipe information based on determining the description text as recipe information for preparing the food when a word about a cooking ingredient in the description text is included in the cooking ingredient information.

13. The artificial intelligence apparatus of claim 9, further comprising:
a memory configured to store an unclear word database including a list of frequently used unclear words or unclear cooking phrases,
wherein the processor is further configured to:
retrieve a word included in the description text from the unclear word database, and
determine a word included in the description text as an unclear word when the word included in the description text is retrieved from the unclear word database.

14. The artificial intelligence apparatus of claim 13, wherein the unclear word database stores at least one of the amount of cooking ingredient, a texture of the cooking ingredient, a color of the cooking ingredient, a cooking time, a cooking temperature or a cooking progress state.

15. The artificial intelligence apparatus of claim 9, wherein the processor is further configured to:
determine whether the unclear word is related to the amount of cooking ingredient, and
input the image included in the sectional content to an ingredient quantity recognition model, and
wherein the learning processor is further configured to:
generate numerical quantity information for the amount of the cooking ingredient based on a cooking utensil used in an image included in the sectional content and a cooking ingredient appearing in the image included in the sectional content, based on an output of the ingredient quantity recognition model.

16. The artificial intelligence apparatus of claim 9, wherein the processor is further configured to:
determine whether the unclear word is related a cooking process state, and
wherein the learning processor is further configured to:
input the image included in the sectional content to a cooking progress state recognition model, and
generate the numerical information including a cooking time or a cooking temperature according to a cooking ingredient appearing in an image included in the sectional content based on an output of the cooking progress state recognition model.

* * * * *